No. 691,922. Patented Jan. 28, 1902.
W. N. WHITELY & W. N. WHITELY, Jr.
ROLLER BEARING.
(Application filed Nov. 11, 1899.)
(No Model.) 2 Sheets—Sheet 1.
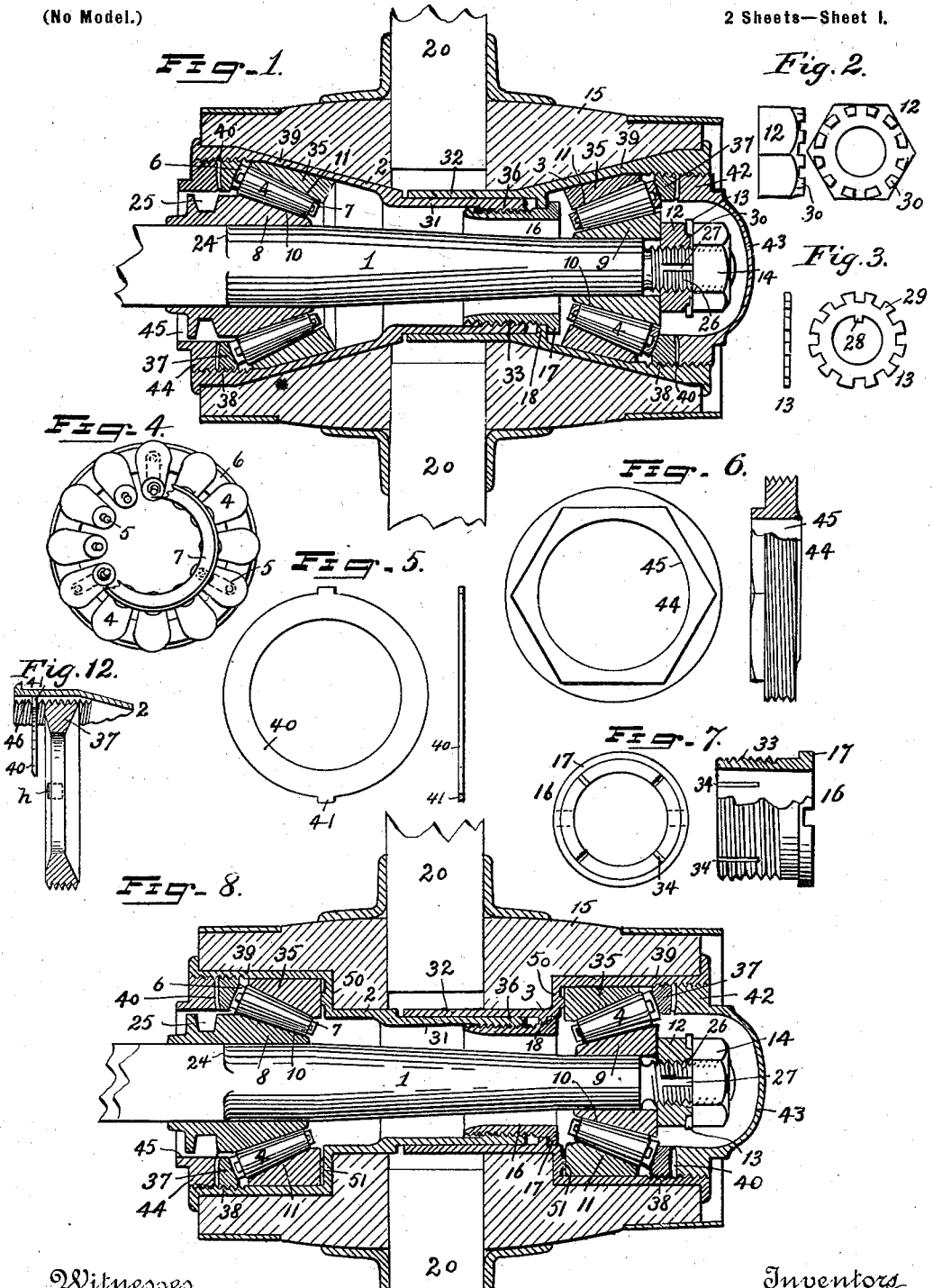

No. 691,922. Patented Jan. 28, 1902.
W. N. WHITELY & W. N. WHITELY, Jr.
ROLLER BEARING.
(Application filed Nov. 11, 1899.)
(No Model.) 2 Sheets—Sheet 2.
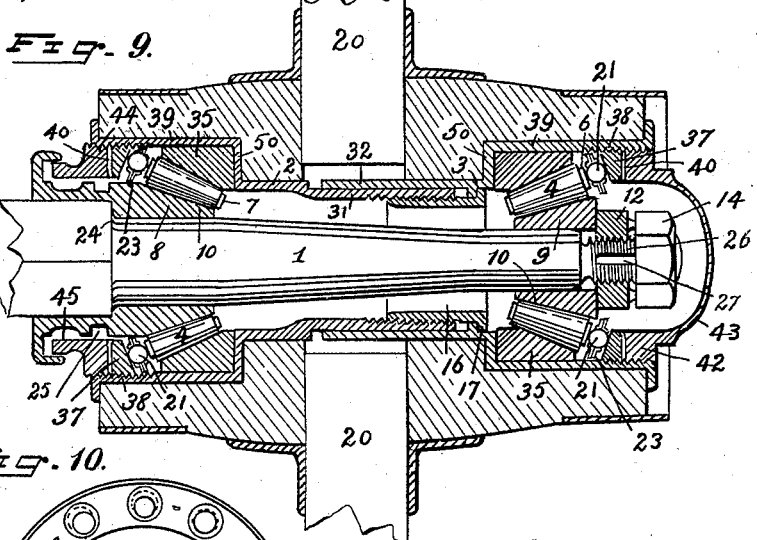
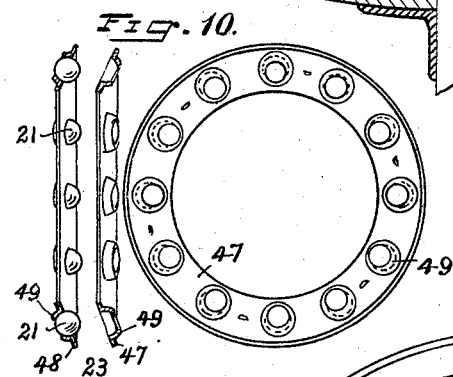
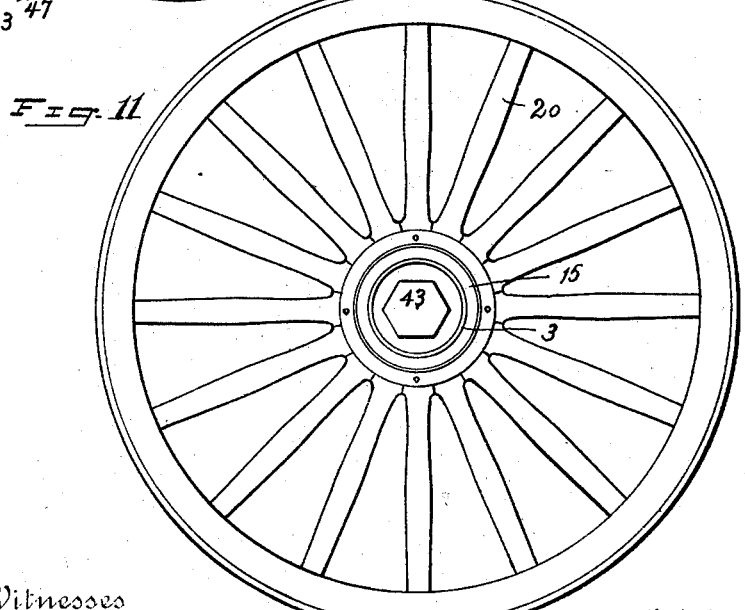
Witnesses
Inventors

UNITED STATES PATENT OFFICE.

WILLIAM N. WHITELY AND WILLIAM N. WHITELY, JR., OF SPRINGFIELD, OHIO.

ROLLER-BEARING.

SPECIFICATION forming part of Letters Patent No. 691,922, dated January 28, 1902.

Application filed November 11, 1899. Serial No. 736,666. (No model.)

*To all whom it may concern:*

Be it known that we, WILLIAM N. WHITELY and WILLIAM N. WHITELY, Jr., citizens of the United States, residing at Springfield, in the county of Clark and State of Ohio, have invented certain new and useful Improvements in Roller-Bearings for Vehicles and Like Purposes, of which the following is a specification.

In order to make our invention more clearly understood, we have shown in the accompanying drawings means for carrying it into effect, without limiting our improvements in their useful applications to the particular constructions which for the purpose of illustration we have delineated.

In said drawings, Figure 1 is a longitudinal section of a roller-bearing for vehicles and other purposes embodying our invention. Fig. 2 shows by side and face views the adjusting-nut. Fig. 3 shows by edge and face views the locking ring or washer. Fig. 4 is an end view, partly broken away, of one set of the inclined bearing-rollers with their retaining-collars. Fig. 5 shows by face and edge views an elastic locking-washer for keeping in place the roller-cages. Fig. 6 shows by a face view and by an edge view, partly in section, the clamping-nut for the non-adjustable end of the bearing. Fig. 7 shows by an inner end view and by a side view, partly in section, the tubular bolt for uniting the casing-sections. Fig. 8 is a longitudinal section of a bearing of a slightly-different form, also embodying our invention. Fig. 9 is a similar view showing additional means for keeping the roller-cages in place and another form of the inner bearing shoulder or cone of the axle. Fig. 10 shows by a sectional view with the parts separated and by an inner face view one of the sets of balls and their cages for taking the longitudinal thrust of the roller-cage. Fig. 11 is a side view of a wheel embodying that form of our invention in which wooden spokes are employed. Fig. 12 is a section of the abutment-ring, with a portion of the casing and locking-washer.

Referring to the drawings, 1 is a portion of an axle of a vehicle, having a shoulder 24 and fixed and adjustable bearing-rings, shoulders, or cones 8 and 9. Preferably the outer shoulder 9 is the one which is adjustable to take up wear and the other is set tightly up against the shoulder 24. These shoulders are formed with bearing-surfaces 10, the said surface of one shoulder being inclined oppositely to the inclination of the other surface. As illustrated, they both incline inwardly toward each other; but it will be understood that these surfaces might both incline in the opposite directions to those shown. The inner shoulder 8, or that toward the body of the vehicle, is formed with one or more grooves 25 to receive a suitable dust-proof packing.

The necessary adjustment of the shoulder 9 to take up wear is effected by the following means:

26 is a screw-threaded extension of the axle, formed with one or more longitudinal grooves 27.

12 is an adjusting-nut screwing on the extension 26 and bearing against the outer end of the shoulder or cone 9, which latter overhangs or overlaps said extension.

13 is an interlocking ring or washer having one or more inwardly-extending lugs 28 engaging the groove or grooves 27, and thereby held from rotation relative to the axle, and also having other lugs or projections 29, which engage corresponding projections or teeth 30 on the nut 12 to hold the latter similarly from rotation.

14 is a clamping-nut also screwing on the extension 26 outside the ring 13 and acting to keep the latter in mutual engagement with the axle and adjusting-nut.

The ring 13 is preferably of elastic material, which is forced out of its normal plane or shape by the opposing surfaces of the nuts 12 and 14, and thereby reacts to hold the nut 14 frictionally from any accidental rotation. By backing off the nut 14, sliding the ring 13 out of engagement with the nut 12, and then screwing in the latter the cone 9 may be forced toward the cone 8 and the bearing tightened. On replacing the ring and screwing up the nut 14 tightly the parts will be securely locked in the adjusted position.

2 3 indicate the bearing-casing, formed in two parts united together, so as to inclose, grasp, or clamp the wheel-hub 15. This is preferably accomplished by making the casing smaller in the middle than at the ends, (when suspension-spokes are used the casing may have another form,) inserting the parts 2 and 3 through the opposite ends of the hub, which is shaped interiorly to correspond with and fit said parts, telescoping said parts on each other by means of inner and outer tubes 31 32, and then drawing said parts together by a suitable clamping means. Such a means is illustrated, consisting of a bolt 16, Fig. 7, made tubular to receive the axle, having a flange or head 17, a screw-thread 33, and slits 34 in the threaded end. This end is thin and elastic and is slightly expanded, so that when the bolt is passed into the part 3 and screwed tightly up into a thread 36 in the tube 31 till its head 17 engages a flange or shoulder 18 in the part 3 and until the parts 2 and 3 are forced firmly into and against the hub the inner end of the bolt will have passed a little beyond the thread 36 and will expand, Fig. 1. This will effect a frictional locking and secure the bolt against any accidental unscrewing.

35 and 35 are the outer hollow rings, cones, or shoulders, fixed, respectively, in enlarged chambers 39 in the outer ends of the casing parts 2 and 3 by any preferred means and having bearing-surfaces 11 arranged to oppose the surfaces 10. Between said bearing-surfaces are arranged the rollers 4 on inclined axles and tapered in form to correspond with the respective angles of inclination of the inner and outer bearing-surfaces, which are somewhat different. The rollers are held on journal-pins 5, fixed at their outer and inner ends in collars or rings 6 7, the whole constituting a cage which as a unit may be inserted in or removed from the casing.

37 37 indicate abutment or retaining rings having spanner-holes $h$ and screwed into the outer ends of the casing on threads 38 and adapted to counteract the longitudinal thrust of the roller-cages, which takes place in a direction toward the larger ends of the rollers, and to hold the cages and rollers in place. For holding the rings 37 fixed after adjustment we prefer the following means: 40 is a thin elastic (metallic) ring or washer, Fig. 5, formed with one or more outwardly-extending lugs 41, adapted to engage a corresponding longitudinal groove or grooves 46 in the casing. This washer is slipped into the casing at the outer side of the ring 37 after the latter has been screwed in the desired distance and will be held from turning by the lugs 41. Outside of the washer 40 is screwed in a clamping-nut to securely bind together the parts 37 and 40, as well as said nut. At one end of the bearing this clamping-nut is shown at 42, formed with a cap 43, which incloses the end of the axle. At the other end the nut is indicated at 44, (see also Fig. 6,) having a central aperture 45 for the passage of the axle. In this aperture will fit the packing of the groove 25, already referred to. By making the opposing faces of the parts 37 and 44 (or 42) of a different shape from those of the washer 40 the latter will be bent by the action of the nut and will react to hold the nut from turning. Thus the washer may be made flat, as shown, the outer face of the ring 37 slightly convex, and the inner faces of the nuts 42 and 44 correspondingly concave, whereby the washer will be slightly bent when the parts are tightly clamped, Figs. 1, 8, and 9. When thus clamped, the lugs 41 will hold all of the parts 37, 40, 42, and 44 from accidental rotation.

While the construction above described is practical and useful, we may eliminate friction to a further degree by providing a ball-bearing to receive the longitudinal thrust of the roller-cages. Such thrust will be outward when the rollers are arranged as shown and inward when the inclinations of the two sets of rollers are reversed—that is to say, when the inner ends of the rollers are the larger. This end thrust of the rollers is irrespective of the end thrust of the vehicle. Such a bearing is illustrated in Figs. 9 and 10. 21 indicates balls arranged in a circular series in the casing at the larger ends of the rollers 4 and interposed between the collar 6 and ring 37. 23 is a cage or retainer for the balls 21, holding them properly spaced and enabling each set of balls to be handled as a unit. Said cage consists of inner and outer rings 47 48, stamped or otherwise formed with partispherical sockets 49, open at both their inner and outer sides to allow the balls while held in said sockets to bear on the collar 6 and ring 37. The rings 47 48 are held together by rivets or catches or other suitable means.

Referring to the general shape of the casing 2 3, its outer ends may increase in diameter gradually from the telescoping tubes outward, as in Fig. 1, or the increase in diameter (to form the roller containing chambers 39,) may take place abruptly at a radial flange or wall 50, Figs. 8 and 9. In either case the bearing is especially adapted for use with a wooden hub 15. Said shape of the casing allows the maximum of thickness of hub at the center, where the sockets for the spokes 20 are formed and also enables the casing to grasp and clamp the hub between its two parts 2 and 3 when the latter are drawn together by the bolt 16, as already described. The flange 50 may be formed with a finished ring or seat 51, against which the outer cone 35 may be fitted, Fig. 8.

It will be understood that our bearing may be applied to all kinds of machinery, but is particularly well adapted for use when the axle remains at rest and the wheel revolves around it. It is, however, capable of use where the casing is fixed and the axle revolves.

We claim—

1. In a roller-bearing the combination of a series of inclined rollers, an opposing series of inclined rollers, corresponding inner and outer bearing-cones for said rollers, an axle carrying said inner bearing-cones, and means for adjusting one of the inner bearing-cones consisting of an adjusting-nut screwing on the axle and engaging the adjustable cone, a clamping-nut which may be screwed toward and from said adjustable nut, and a non-rotative washer clamped between said nuts and interlocking with the adjusting-nut and with the axle.

2. The combination of the axle, the two-part casing surrounding the same, and a tubular bolt surrounding the axle and engaging the parts of the casing, the threaded end of the bolt being slitted and expanded.

3. The combination of the axle, the two-part casing surrounding the same with its parts telescoping on each other, and a tubular bolt surrounding the axle and engaging the parts of the casing.

4. The combination of an axle, a casing surrounding the same, outer bearing-rings in said casing, inner bearing-rings on the axle, two sets of rollers interposed between said inner and outer rings, rings 37 controlling said rollers relative to their bearing-rings, non-rotary washers 40 at the outer sides of the rings 37, and means for securing said washers screwed into the outer ends of the casing.

5. The combination of the rollers 4, the bearing rings or cones 8, 9, 35, 35, the two-part casing, the tubular bolt 16, the hub having spoke-seats extending to points within the circle of the ends of said casing, means for holding said rollers apart from each other, a ball-bearing for said holding means, the rings 37, the non-rotary washers 40, clamping-nuts for the latter, and means for adjusting the cone 9.

6. In an antifriction-bearing the combination, with inner and outer bearing-rings, and antifriction devices interposed between the same, of a two-part casing the parts of which telescope on each other by smooth bearing-surfaces, and means for drawing said parts longitudinally together.

7. In an antifriction-bearing the combination, with inner and outer bearing-rings and interposed antifriction devices of a two-part casing the parts of which telescope on each other by smooth bearing-surfaces, and a tubular bolt engaging said parts and adapted to draw them together.

8. In an antifriction-bearing the combination, with inner and outer bearing-rings and interposed antifriction devices, of a two-part casing one part having the tube 31 provided with the thread 36 and the other having the tube 32 adapted to slide on the tube 31 and provided with a shoulder 18, and a tubular bolt engaging said shoulder and thread.

9. The combination of the tapered rollers 4, the spacing-collars 6 and 7, the pivot-pins 5, the balls against which one of said collars is adapted to run, means for confining said balls, inner and outer bearing-rings for said rollers, and an axle and casing carrying said bearing-rings.

10. The combination of the casing and axle, an interposed roller-bearing comprising rollers and a containing-cage, and an end abutment for said cage comprising a ring 37 screwing into said casing, a non-rotary washer 40, and a clamping-nut for the latter.

11. The combination of a series of inclined rollers, inner and outer bearing-cones for the same, a ring at the end of said rollers, and a series of balls engaging said ring and limiting the endwise movement of said rollers relative to their cones.

12. In a roller-bearing the combination of two series of rollers, corresponding inner and outer bearing-rings for said rollers, a casing or hub carrying said outer rings, an axle carrying said inner rings, one of said inner rings being longitudinally movable on the axle, and means for adjusting said movable ring consisting of an adjusting-nut screwing on the axle and engaging said adjustable ring, a clamping-nut which may be screwed toward and from said adjusting-nut, and a non-rotative washer clamped between said nuts and interlocking with the adjusting-nut and with the axle.

13. In a roller-bearing the combination of two series of rollers, inner and outer bearing-rings for said rollers, a two-part casing carrying said outer bearing-rings and having its parts telescoping on each other, means for drawing the parts of the casing in straight lines toward each other, an axle carrying said inner bearing-rings, one of the rings being longitudinally movable, and means for adjusting the movable ring consisting of an adjusting-nut, a clamping-nut and an interlocking washer clamped between said nuts.

14. The combination of a series of rollers, inner and outer bearing-rings for the same, means for spacing said rollers, such as a cage, and a series of balls within the chamber occupied by said rollers and receiving the endwise pressure of the rollers.

15. In an antifriction-bearing the combination of a series of rollers, inner and outer bearing rings or parts for the same, inner and outer bearing members carrying said rings or parts, and a series of antifriction devices such as balls interposed between said rollers and one of said bearing members and limiting the end movement of said rollers.

In testimony whereof we affix our signatures in presence of two witnesses.

WILLIAM N. WHITELY.
WILLIAM N. WHITELY, JR.

Witnesses:
JOHN L. GILLIGAN,
EDWIN S. HOUCK.